(12) United States Patent
Tammana et al.

(10) Patent No.: US 12,114,256 B2
(45) Date of Patent: Oct. 8, 2024

(54) WIRELESS ACCESS NODE SELECTION BASED ON RECEIVED SIGNAL STRENGTH (RSS) AND ACCESS NODE CO-LOCATION

(71) Applicant: T-Mobile Innovations LLC, Overland Park, KS (US)

(72) Inventors: Deepak Nadh Tammana, Bothell, WA (US); Roopesh Kumar Polaganga, Bothell, WA (US)

(73) Assignee: T-MOBILE INNOVATIONS LLC, Overland Park, KS (US)

(*) Notice: Subject to any disclaimer, the term of this patent is extended or adjusted under 35 U.S.C. 154(b) by 512 days.

(21) Appl. No.: 17/529,058

(22) Filed: Nov. 17, 2021

(65) Prior Publication Data

US 2023/0156588 A1 May 18, 2023

(51) Int. Cl.
*H04W 48/20* (2009.01)
*H04W 48/16* (2009.01)

(52) U.S. Cl.
CPC .......... *H04W 48/20* (2013.01); *H04W 48/16* (2013.01)

(58) Field of Classification Search
CPC ............................. H04W 48/20; H04W 48/16
See application file for complete search history.

(56) References Cited

U.S. PATENT DOCUMENTS

| | | | |
|---|---|---|---|
| 8,660,558 B2 | 2/2014 | Kazmi et al. | |
| 8,923,880 B2 | 12/2014 | Yiu | |
| 9,055,501 B2 | 6/2015 | Ekemark | |
| 9,408,116 B2 | 8/2016 | Pakniat et al. | |
| 9,521,664 B2 | 12/2016 | Chen et al. | |
| 9,749,996 B2 | 8/2017 | Park et al. | |
| 9,775,045 B2 | 9/2017 | Li et al. | |
| 9,832,747 B2 | 11/2017 | Yoon et al. | |
| 10,129,790 B2 | 11/2018 | Brisebois | |
| 10,405,267 B2 | 9/2019 | Marinier et al. | |
| 2012/0120922 A1 | 5/2012 | Huang et al. | |
| 2017/0367036 A1 | 12/2017 | Chen et al. | |
| 2019/0306812 A1* | 10/2019 | Sengupta | H04L 5/0064 |
| 2021/0068077 A1* | 3/2021 | Raghavan | H04B 7/0404 |

FOREIGN PATENT DOCUMENTS

| | | |
|---|---|---|
| EP | 2744297 A1 | 6/2014 |
| WO | 2013120274 A1 | 8/2013 |

OTHER PUBLICATIONS

New Postcom; "Considerations on requirements and scenarios of WLAN/3GPP Radio"; 3GPP TSG RAN WG2 Meeting #81; Jan. 2013; pp. 1-4; R2-130270; 3GPP; St. Julian's, Malta.

* cited by examiner

*Primary Examiner* — Basil Ma

(57) ABSTRACT

A wireless communication network serves User Equipment (UE) based on co-location and Received Signal Strength (RSS). A serving wireless access node selects itself for an uplink and downlink when no candidate wireless access nodes are co-located with the serving node. The serving node selects a candidate node for the uplink and downlink when the candidate node is co-located with the serving node and has an RSS level that exceeds a first threshold. The serving node selects itself for the uplink and selects a candidate node for the downlink when the candidate node is co-located with the serving node and has an RSS between the first threshold and a second threshold. The UE may trigger access node selection by entering idle mode. The serving node may condition the selection of a candidate node on whether the candidate node supports a wireless network slice for the UE.

20 Claims, 9 Drawing Sheets

WIRELESS ACCESS NODE SELECTION BASED ON RECEIVED SIGNAL STRENGTH (RSS) AND ACCESS NODE CO-LOCATION

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless user devices execute user applications that use the wireless data services. For example, a helmet may execute an augmented-reality application that communicates with a video-annotation server over a wireless communication network.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores.

The wireless network elements comprise Access and Mobility Management Functions (AMFs), User Plane Functions (UPFs), and the like. Some of the network elements are grouped into wireless network slices to deliver data communication services that feature low-latency, high-bandwidth, or some other service quality. For example, a UPF in a wireless network slice may be optimized for the augmented-reality application in the wireless user device that is served by the wireless network slice.

To select a wireless access node, the wireless user device scans frequencies to detect wireless access nodes and determine their Received Signal Strength (RSS). The wireless user device selects the wireless access node with the best RSS for wireless attachment. The wireless user device subsequently detects and reports RSS for the wireless access nodes, and the serving wireless access node may select another wireless access node based on RSS report. The serving wireless access node may select a target wireless access node to handover a wireless user device. The serving wireless access node may select a secondary wireless access node to deliver a dual connectivity service.

Unfortunately, the serving wireless access nodes do not effectively select other wireless access nodes to optimize service for the wireless user devices. Moreover, the serving wireless access nodes do not efficiently move the wireless user devices to their optimal wireless access nodes.

TECHNICAL OVERVIEW

A wireless communication network serves User Equipment (UE) based on co-location and Received Signal Strength (RSS). A serving wireless access node selects itself for an uplink and downlink when no candidate wireless access nodes are co-located with the serving node. The serving node selects a candidate node for the uplink and downlink when the candidate node is co-located with the serving node and has an RSS level that exceeds a first threshold. The serving node selects itself for the uplink and selects a candidate node for the downlink when the candidate node is co-located with the serving node and has an RSS between the first threshold and a second threshold. The UE may trigger slice-specific access node selection by entering idle mode. The serving access node may condition the selection of a candidate access node on whether the candidate node supports a wireless network slice for the UE.

DETAILED DESCRIPTION

Figure 1:
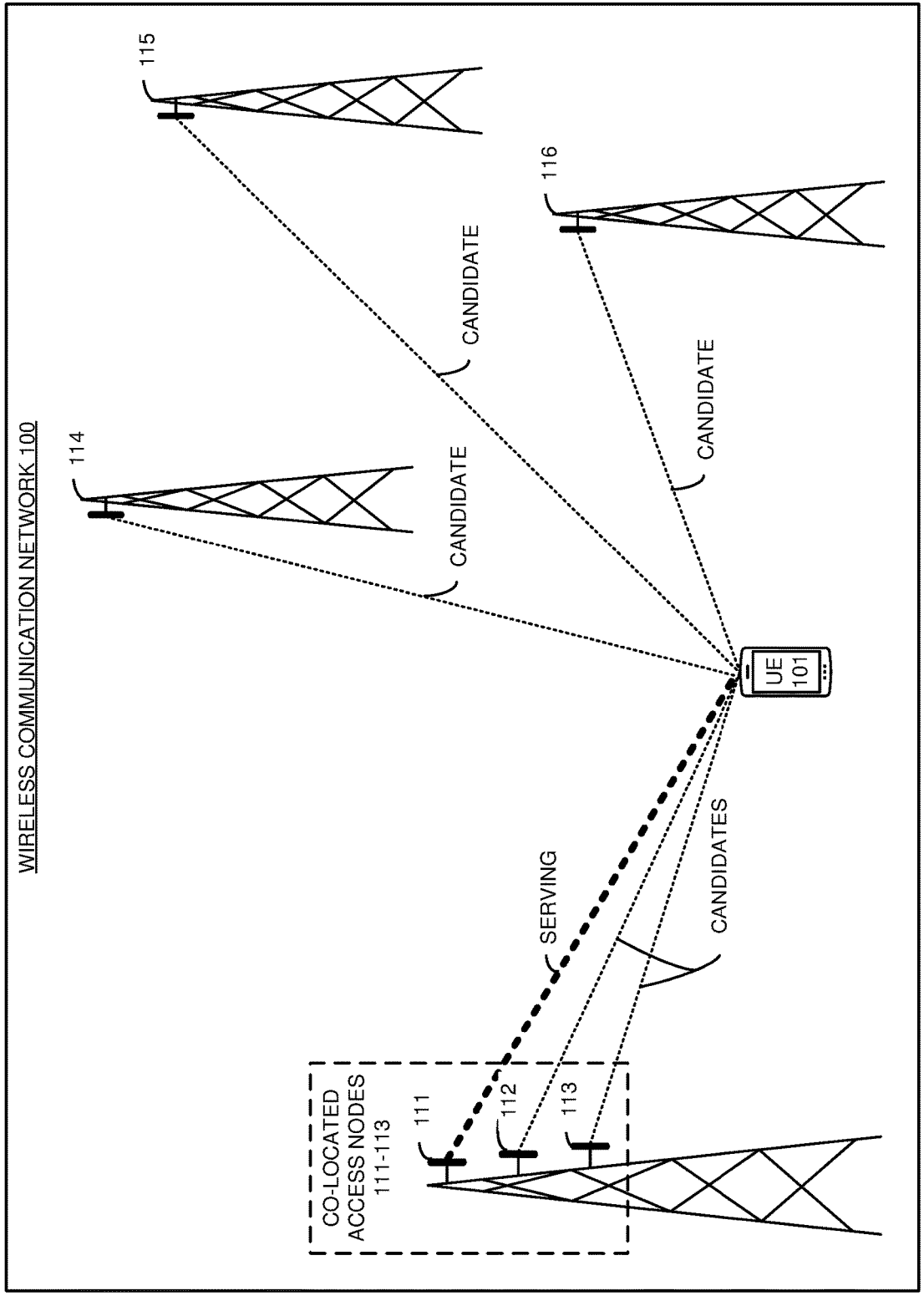
FIG. 1 illustrates an exemplary wireless communication network to serve a User Equipment (UE) based on co-location and Received Signal Strength (RSS).

FIG. 1 illustrates an exemplary wireless communication network 100 to serve User Equipment (UE) 101 based on co-location and Received Signal Strength (RSS). Wireless communication network 100 comprises UE 101 and wireless access nodes 111-116. Wireless access nodes 112-113 are co-located with access node 111. Co-location requires that access nodes 112-113 be physically located within 1000 feet of one another—often mounted on the same tower or structure. Wireless access nodes 114-116 are not co-located with wireless access node 111 because they are not within 1000 feet of wireless access node 111. UE 101 comprises a computer, phone, vehicle, sensor, robot, or some other data appliance with data communication circuitry. Wireless communication network 100 delivers wireless data service to UE 101, and exemplary wireless data services include machine-control, internet-access, media-streaming, social-networking, and/or some other networking product. Wireless communication network 100 is simplified for clarity and typically includes far more UEs and access nodes than shown.

Various examples of network operation and configuration are described herein. In some examples, UE 101 wirelessly attaches to wireless access node 111 which is referred to as the "serving" access node. Other wireless access nodes 112-116 are referred to as "candidate" access nodes. Serving access node 111 determines if any candidate access nodes 112-116 are co-located with serving access node 111. Although candidate access nodes 112-113 are co-located with serving access node 111 in this example, serving access node 111 selects itself for the uplink and the downlink for UE 101 when no candidate access nodes are co-located with serving wireless access node 111. In response to the selfselection, serving access node 111 wirelessly exchanges user data with UE 101 over the uplink and the downlink. When a candidate access node is co-located with serving access node 111 and has an RSS level that exceeds a first threshold, serving access node 111 selects the candidate access node for the uplink and the downlink for UE 101. For example, candidate access node 113 is co-located with serving access node 111 and may have an RSS that exceeds the first threshold. When multiple candidate access nodes have RSS levels that exceed the first threshold, the candidate with the highest RSS is selected. When candidate access node 113 is co-located with serving access node 111 and has the highest RSS that exceeds the first threshold, candidate access node 113 wirelessly exchanges the user data with UE 101 over the uplink and the downlink. When candidate access nodes are co-located with serving access node 111 and have RSS levels that fall below the first threshold but exceed a second threshold, serving access node 111 selects itself for the uplink for UE 101 and selects one of these candidate access nodes for the downlink for UE 101. For example, candidate access node 112 is co-located with serving access node 111 and may have an RSS that falls below the first threshold but exceeds the second threshold. When multiple candidate access nodes have RSS levels between the first and second thresholds, the candidate with the highest RSS is selected. When candidate access node 112 is selected due to its co-location with serving access node 111 and a highest RSS between the first and second thresholds, candidate access node 112 wirelessly transfers user data to UE 101 over downlink while serving access node 111 receives user data from UE 101 over the uplink.

In some examples, UE 101 enters idle mode, and serving access node 111 selects one of candidate wireless access nodes 112-116 to serve UE 101 in response to UE 101 entering idle mode. UE 101 may use a wireless network slice before entering idle mode and serving access node 111 selects a candidate access node that supports the wireless network slice in response to UE 101 entering idle mode. The wireless network slice might comprise Ultra Reliable Low Latency Communications (URLLC), enhanced Mobile Broadband (eMBB), massive Machine Type Communication (mMTC), or some other network service. UE 101 may use Carrier Aggregation (CA) before entering idle mode and serving access node 111 could select a candidate access node that supports CA in response to UE 101 entering idle mode. Wireless access nodes could maintain data structures that translate neighbor access node identifiers into slice and CA capability.

Advantageously, serving wireless access node 111 effectively selects candidate wireless access nodes 112-116 to optimize service delivery for UE 101 based on RSS, co-location, and possibly slice support. Moreover, serving wireless access node 111 efficiently moves UE 101 to the optimal wireless access node—possibly optimized the UE's recent wireless network slice.

UE 101 and wireless access nodes 111-116 communicate over wireless links that use wireless technologies like Fifth Generation New Radio (5GNR), Long Term Evolution (LTE), Millimeter Wave (mmW), Institute of Electrical and Electronic Engineers (IEEE) 802.11 (WIFI), Low-Power Wide Area Network (LP-WAN), Bluetooth, and/or some other wireless communication protocols. In some examples, serving access node 111 comprises an LTE access node and candidate access nodes 112-116 comprise 5GNR access nodes. In other examples, serving access node 111 comprises a 5GNR access node and candidate access nodes 112-116 comprise LTE, mmW, WIFI, LP-WAN, Bluetooth, and/or some other type of wireless access nodes—including combinations thereof.

Wireless access nodes 111-116 communicate with one another and a network core over network connections that comprise metallic wiring, glass fibers, radio channels, or some other communication media. The network connections use technologies like IEEE 802.3 (ETHERNET), Internet Protocol (IP), Time Division Multiplex (TDM), Data Over Cable System Interface Specification (DOCSIS), General Packet Radio Service Transfer Protocol (GTP), mmW, 5GNR, LTE, WIFI, LP-WAN, Bluetooth, virtual switching, inter-processor communication, bus interfaces, and/or some other data communication protocols. UE 101 and wireless access nodes 111-116 include radios. UE 101 and wireless access nodes 111-116 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein.

Figure 2:
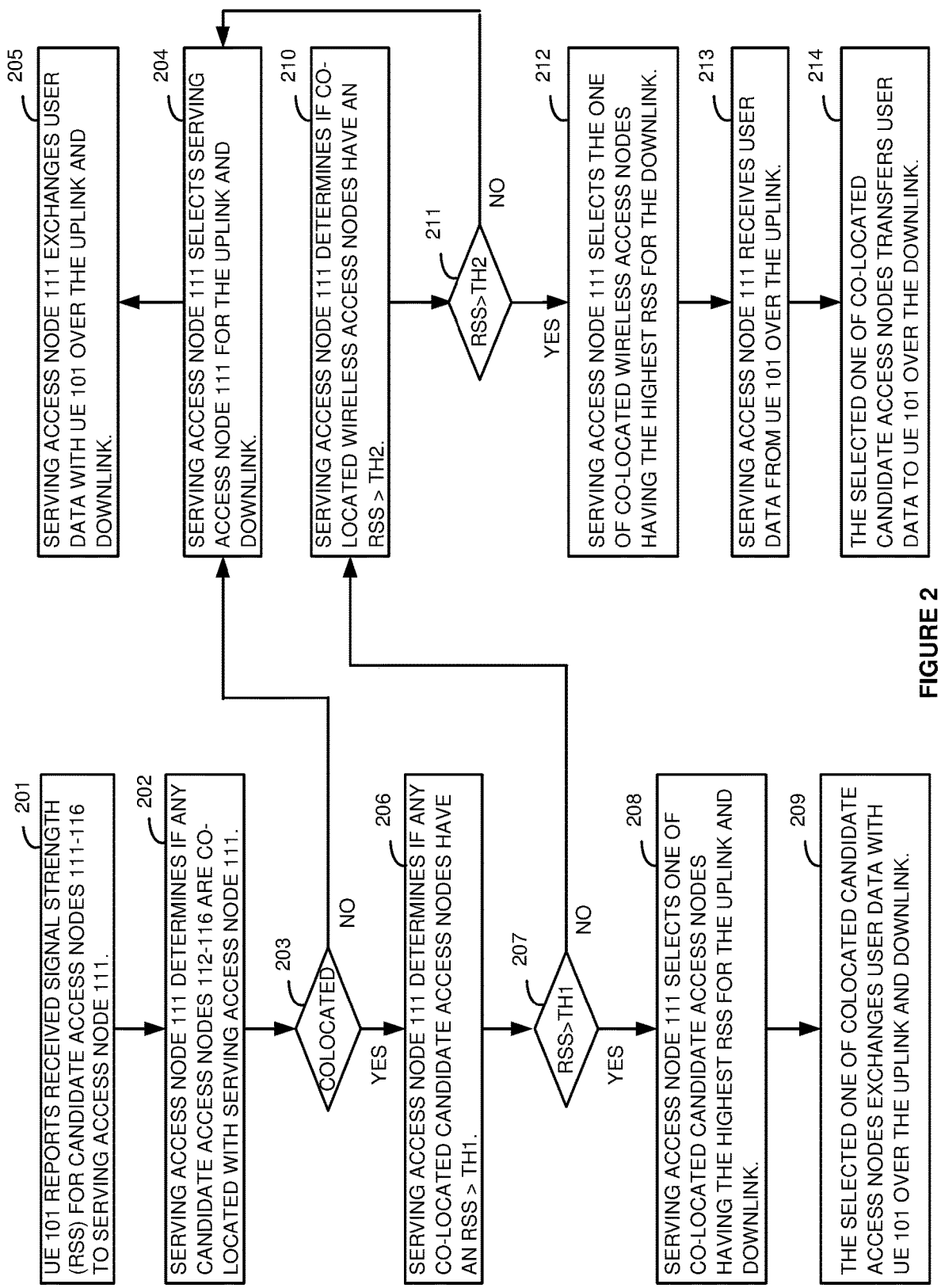
FIG. 2 illustrates an exemplary operation of the wireless communication network to serve the UE based on co-location and RSS.

FIG. 2 illustrates an exemplary operation of wireless communication network 100 to serve UE 101 based on co-location and RSS. The operation may differ in other examples. UE 101 detects and reports Received Signal Strength (RSS) for wireless access nodes 112-116 to serving access node 111 (201). Serving access node 111 determines if any candidate access nodes 112-116 are co-located with serving access node 111 (202). When no candidate access node is co-located with serving wireless access node 111 (203), serving access node 111 selects itself for the uplink and the downlink for UE 101 (204) and wirelessly exchanges user data with UE 101 over the uplink and the downlink (205). When candidate access nodes are co-located with serving access node 111 (203), serving access node 111 determines when these candidates have an RSS level that exceeds a first threshold (206). When one of these candidate access nodes has an RSS level that exceeds the first threshold (207), serving access node 111 selects the candidate access node for the uplink and the downlink for UE 101 (208), and the selected candidate access node wirelessly exchanges the user data with UE 101 over the uplink and the downlink (209). When candidate access nodes are co-located with serving access node 111 (203) but have RSS levels that falls below the first threshold (207), serving access node 111 determines if any of these candidate access nodes have RSS levels that exceed a second threshold (210). When candidate access nodes are co-located with serving access node 111 (203) and have RSS levels lower than the first threshold (207) and higher than the second threshold (211), serving access node 111 selects itself for the uplink for UE 101 and selects the candidate access node for the downlink for UE 101 (212). Serving access node 111 wirelessly receives user data from UE 101 over the uplink (213) and the selected candidate access node transfers user data to UE 101 over the downlink (214).

Figure 3:
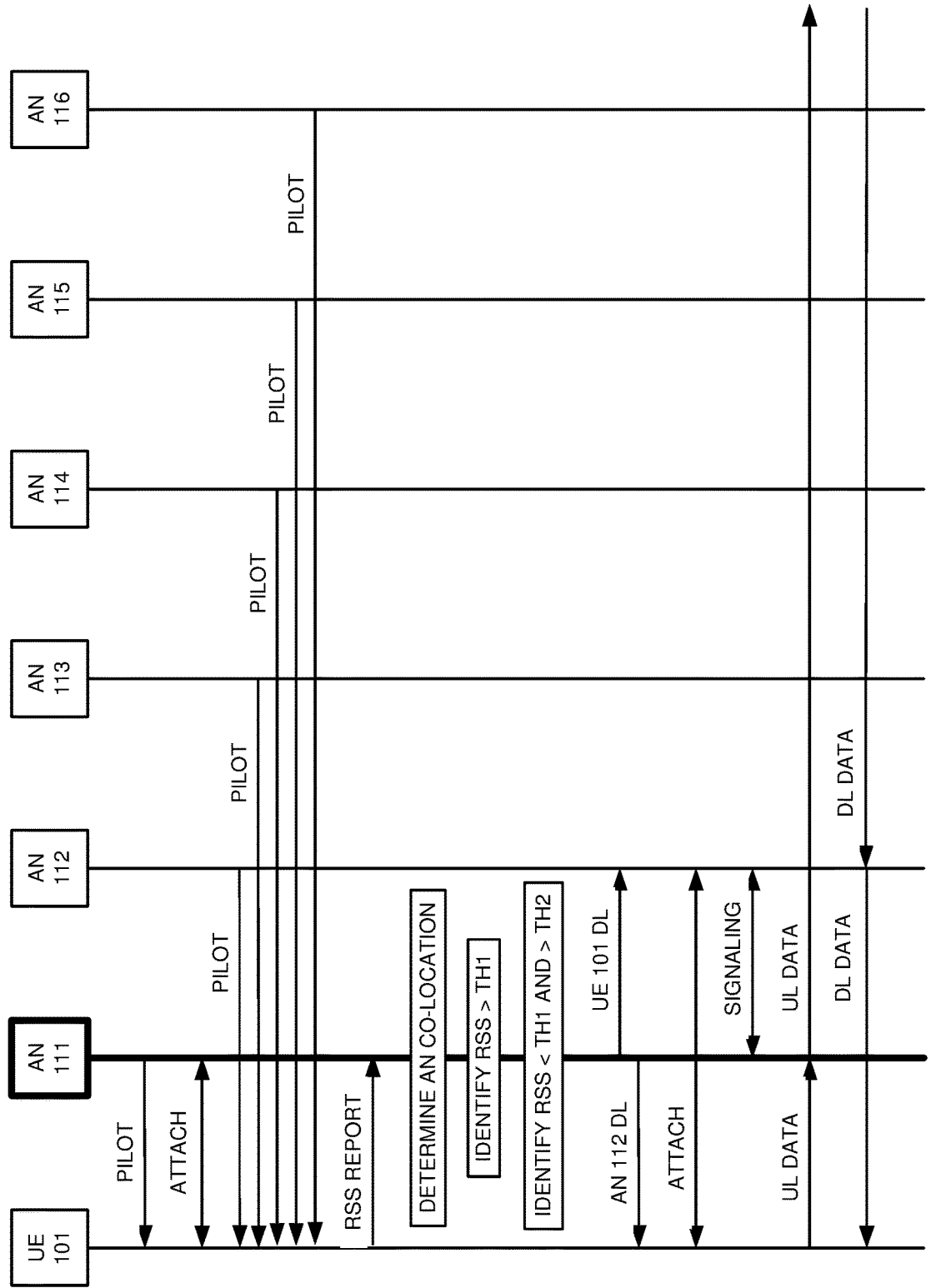
FIG. 3 illustrates an exemplary operation of the wireless communication network to serve the UE based on co-location and RSS.

FIG. 3 illustrates an exemplary operation of wireless communication network 100 to serve UE 101 based on co-location and RSS. The operation may differ in other examples. UE 101 wirelessly receives a pilot signal from serving Access Node (AN) 111 and responsively attaches to serving AN 111. UE 101 receives pilot signals from candidate access nodes 112-116 and reports RSS to serving AN 111. Serving AN 111 determines if any candidate access nodes are co-located with serving access node 111. For example, serving AN 111 may host a data structure that correlates neighbor access nodes like candidate nodes 112-116 with their co-location status. When no candidate access nodes 112-116 are co-located with serving wireless access node 111, serving access node 111 selects itself for the uplink and the downlink for UE 101. In this example, candidate access nodes 112-113 are co-located. When some candidate access nodes are co-located with serving access node 111, serving access node 111 determines if any of these candidate access nodes have an RSS level that exceeds a first threshold and selects one of these candidate access nodes for the uplink and downlink for UE 101. In this example, the RSS for co-located nodes 112-113 falls below the first threshold. When none of the candidate access nodes that are co-located also have an RSS level that exceeds the first threshold, serving access node 111 determines if any of the co-located candidate access nodes have RSS levels that exceed a second threshold. In this example, serving access node 111 selects candidate access node 112 because candidate access node 112 is co-located with serving access node 111 and has an RSS level between the first threshold and the second threshold. Serving access node 111 signals candidate access node 112 to serve UE 101 over the downlink. Serving access node 111 signals UE 101 to use candidate access node 112 for the downlink. UE 101 transfers user data to external systems over the uplink to serving AN 111. UE 101 receives user data from the external systems over the downlink from candidate access node 112.

Figure 4:
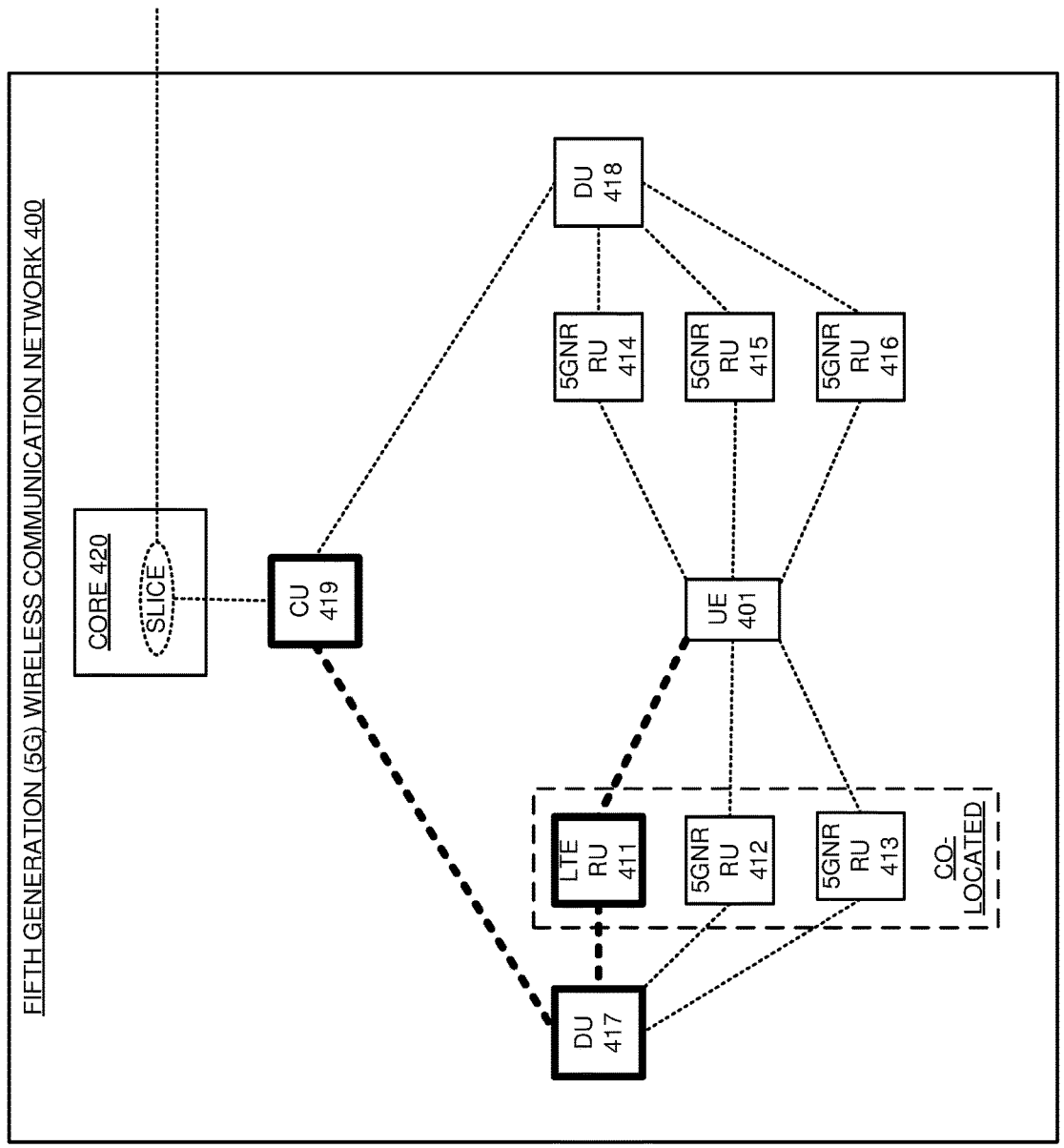
FIG. 4 illustrates an exemplary Fifth Generation (5G) wireless communication network to serve a UE based on co-location, RSS, and slice.

FIG. 4 illustrates exemplary Fifth Generation (5G) wireless communication network 400 to serve UE 401 based on co-location, RSS, and slice. 5G wireless communication network 400 comprises an example of wireless communication network 100, although network 100 may differ. 5G wireless communication network 400 comprises: UE 401, RUs 411-416, DUs 417-418, CU 419, and core 420. RUs 411-413 are co-located within 1000 feet of one another and may be mounted on the same tower.

UE 401 attaches to CU 419 over LTE RU 411 and DU 417. UE 401 interacts with core 420 over LTE RU 411, DU 417, and CU 419 to authorize UE 401 for a wireless network slice like URLLC, eMBB, or mMTC. UE 401 exchanges user data with the wireless network slice in core 420 over LTE RU 411, DU 417, and CU 419. The wireless network slice in core 420 may exchange the user data with external systems.

UE 401 eventually goes into idle mode. In idle mode, UE 401 occasionally checks the network for incoming messages. UE 401 determines RSS for 5GNR RUs 412-416 and reports the RSS levels to CU 419. In response to UE 401 entering idle mode, CU 419 determines if any candidate RUs for UE 401 are co-located with serving RU 411. When no candidate RUs are co-located with serving RU 411, CU 419 selects serving RU 411 for the uplink and the downlink for UE 401. In response to the selection of RU 411, UE 401 exchanges user data with the wireless network slice in core 420 over the uplink and the downlink that traverse LTE RU 411, DU 417, and CU 419.

In this example, CU 419 determines that candidate 5GNR RUs 412-413 are co-located with serving LTE RU 411. If one of these candidate RUs 412-413 supports the wireless network slice and has an RSS level that exceeds a first threshold, then CU 419 selects that candidate RU for the uplink and the downlink for UE 401. When co-located 5GNR RU 413 supports the wireless network slice and has an RSS that exceeds the first threshold, UE 401 exchanges user data with the wireless network slice over the uplink and the downlink that traverse 5GNR RU 413, DU 417, and CU 419.

In this example, candidate 5GNR RUs 412-413 are co-located with serving LTE RU 411. If one of candidate RUs 412-413 supports the wireless network slice and has an RSS level between the first threshold and a second threshold, then CU 419 selects that candidate RU for the downlink for UE 401. When co-located 5GNR RU 412 supports the wireless network slice and has an RSS between the first threshold and the second threshold, UE 401 exchanges user data with the wireless network slice over the uplink that traverses LTE RU 411, DU 417, and CU 419 and over the downlink that traverses 5GNR RU 412, DU 417, and CU 419.

In some examples, UE 401 and serving access node 411 use Carrier Aggregation (CA) before UE 401 enters idle mode. In response to UE 401 entering idle mode, CU 419 selects a co-located access node for the uplink and downlink for UE 401 when the candidate supports CA and has an RSS level that exceeds the first threshold. CU 419 may also select a co-located access node for the downlink for UE 401 when that candidate supports CA and has an RSS level between the first threshold and the second threshold.

Figure 5:
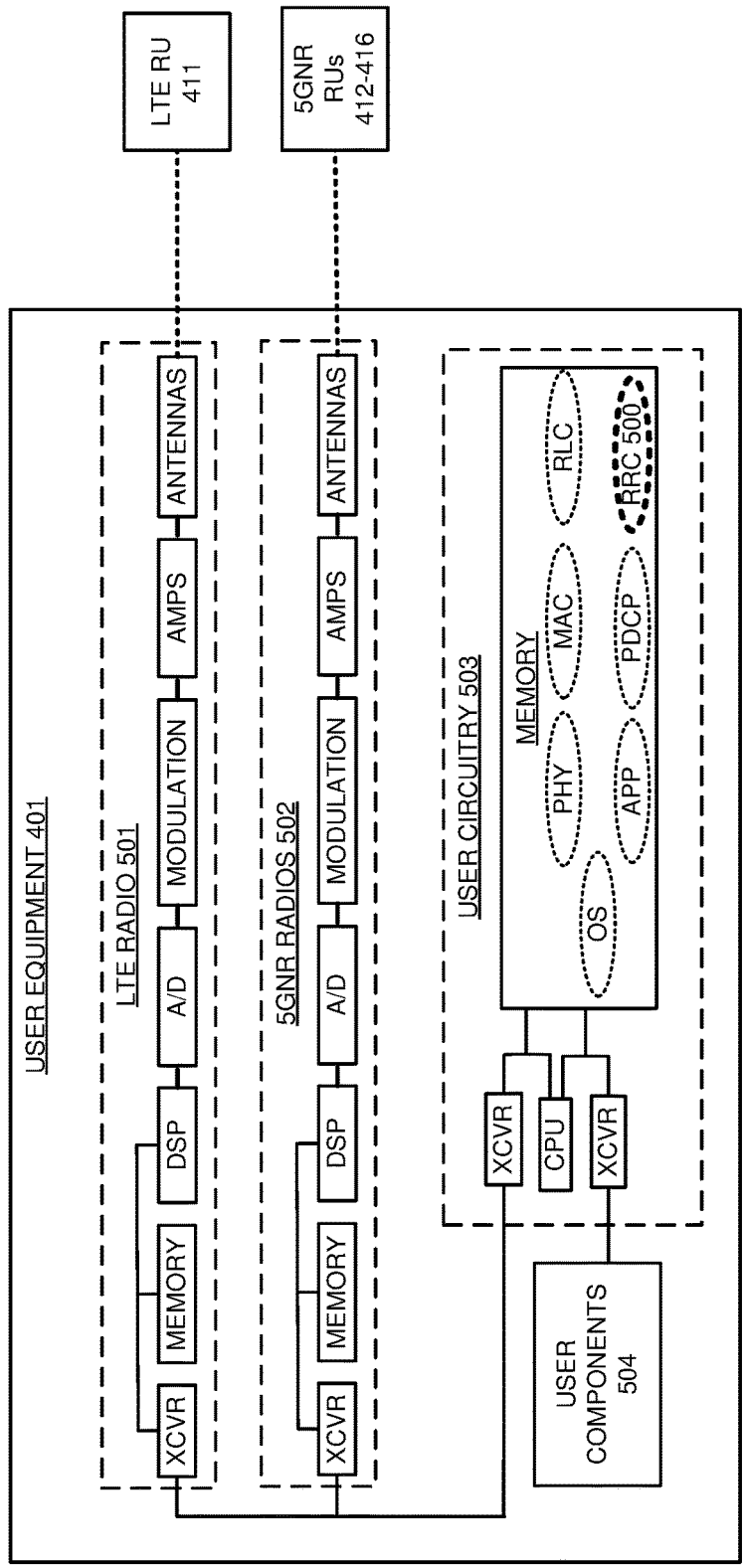
FIG. 5 illustrates an exemplary UE in the 5G wireless communication network.

FIG. 5 illustrates exemplary UE 401 in 5G wireless communication network 400. UE 401 comprises an example of UE 101, although UE 101 may differ. UE 401 comprises LTE radio 501, 5GNR radios 502, user circuitry 503, and user components 504. User components 504 comprise sensors, controllers, displays, or some other user apparatus that generates slice data. Radios 501-502 comprise antennas, amplifiers, filters, modulation, analog-to-digital interfaces, DSP, memory, and transceivers that are coupled over bus circuitry. User circuitry 504 comprises memory, CPU, user interfaces and components, and transceivers that are coupled over bus circuitry. The memory in user circuitry 504 stores an operating system (OS), user applications (APP), and network applications for Physical Layers (PHY), Media Access Controls (MAC), Radio Link Controls (RLC), Packet Data Convergence Protocols (PDCP), and Radio Resource Control (RRC) 500. The antennas in LTE radio 501 are wirelessly coupled to LTE RU 411 over an LTE link. The antennas in 5GNR radios 502 are wirelessly coupled to 5GNR RUs 412-416 over a 5GNR links. Transceivers (XCVRs) in radios 501-502 are coupled to transceivers in user circuitry 503. Transceivers in user circuitry 503 are coupled to user components 504. The CPU in user circuitry 504 executes the operating system, user applications, and network applications to exchange network signaling and user data RUs 411-416 over radios 501-502.

Figure 6:
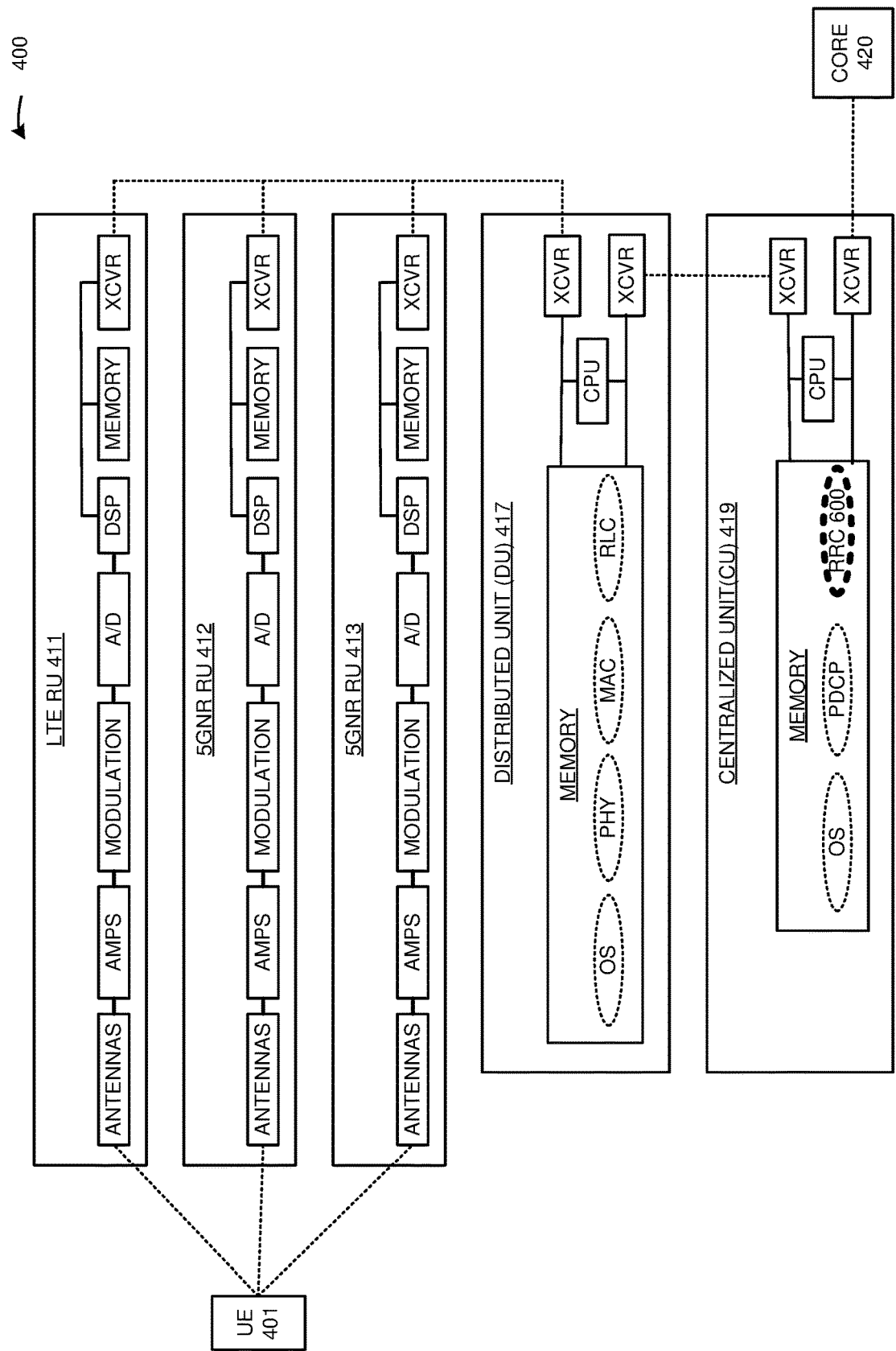
FIG. 6 illustrates exemplary Radio Units (RUs), Distributed Unit (DU), and Centralized Unit (CU) in 5G wireless communication network 400.

FIG. 6 illustrates exemplary Radio Units (RUs) 411-413, Distributed Unit (DU) 417, and Centralized Unit (CU) 419 in 5G wireless communication network 400. RUs 411-413, DU 417, and CU 419 comprise examples of wireless access nodes 111-116, although nodes 111-116 may differ. RUs 412-413 comprise examples of RUs 414-416, although RUs 414-416 may fifer. DU 417 comprises an example of DU 418, although DU 418 may differ. RUs 411-413 comprise antennas, amplifiers, filters, modulation, analog-to-digital interfaces, DSP, memory, radio applications, and transceivers that are coupled over bus circuitry. DU 417 comprises memory, CPU, user interfaces and components, and transceivers that are coupled over bus circuitry. The memory in DU 417 stores operating systems and network applications for PHY, MAC, and RLC. CU 419 comprises memory, CPU, user interfaces and components, and transceivers that are coupled over bus circuitry. The memory in CU 419 stores operating systems and network applications for PDCP and RRC 600. The antennas in LTE RU 411 are wirelessly coupled to UE 401 over an LTE link. The antennas in 5GNR RUs 412-413 are wirelessly coupled to UE 401 over 5GNR links. Transceivers in RUs 411-413 are coupled to transceivers in DU 417. Transceivers in DU 417 are coupled to transceivers in CU 419. Transceivers in CU 149 are coupled to core 420. The DSP and CPU in RUs 411-413, DU 417, and CU 419 execute the operating systems, radio applications, and network applications to exchange network signaling and user data with UE 401 and network core 420.

Figure 7:
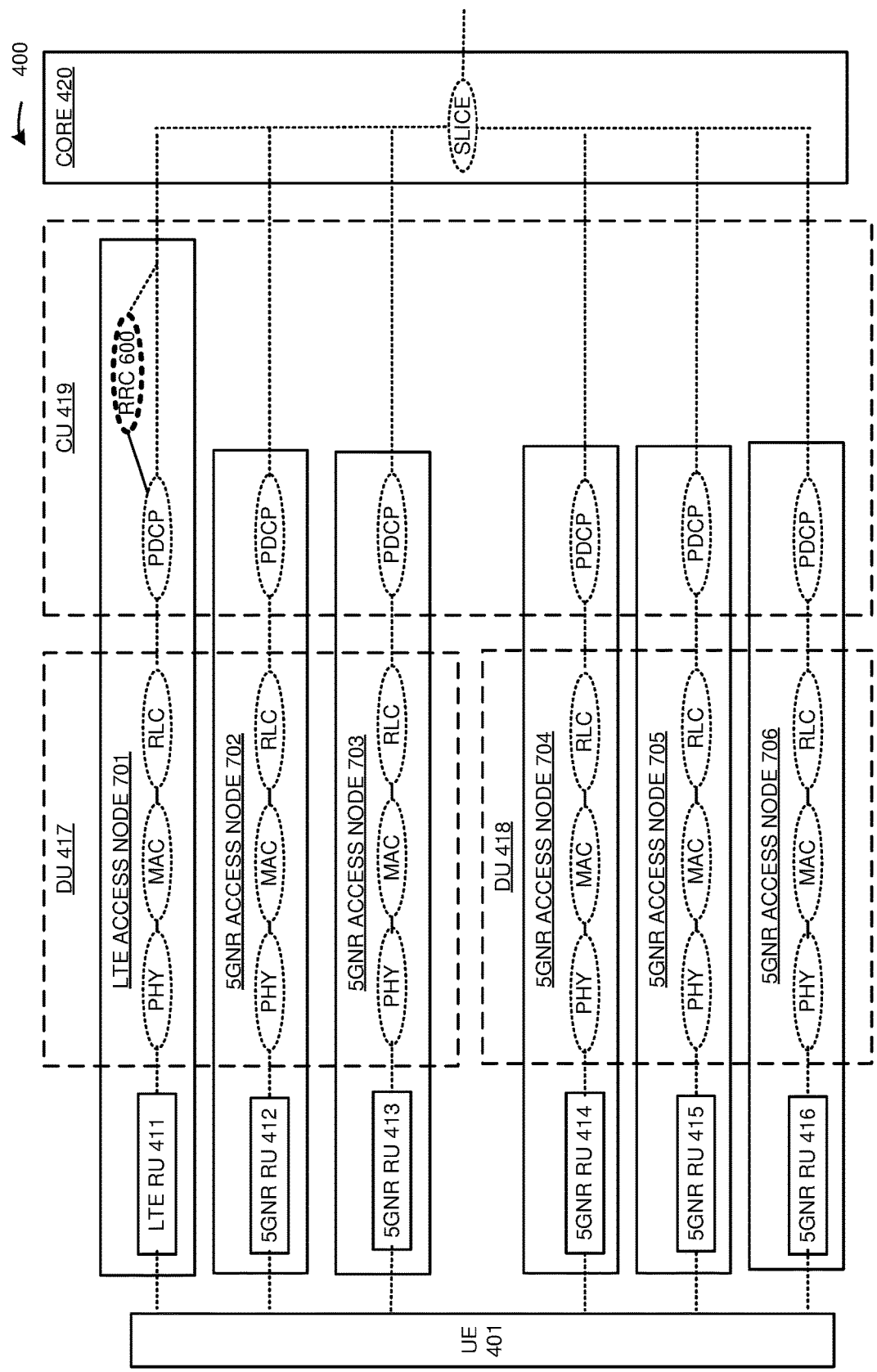
FIG. 7 illustrates exemplary wireless access nodes in the 5G wireless communication network.

FIG. 7 illustrates exemplary wireless access nodes 701-706 in 5G wireless communication network 400. LTE access node 701 comprises LTE RU 411, a portion of DU 417 (PHY, MAC, RLC), and a portion of CU 419 (PDCP, RRC 600). 5GNR access node 702 comprises 5GNR RU 412, a portion of DU 417 (PHY, MAC, RLC), and a portion of CU 419 (PDCP). 5GNR access node 703 comprises 5GNR RU 413, a portion of DU 417 (PHY, MAC, RLC), and a portion of CU 419 (PDCP). 5GNR access node 704 comprises 5GNR RU 414, a portion of DU 418 (PHY, MAC, RLC), and a portion of CU 419 (PDCP). 5GNR access node 705 comprises 5GNR RU 415, a portion of DU 418 (PHY, MAC, RLC), and a portion of CU 419 (PDCP). 5GNR access node 706 comprises 5GNR RU 416, a portion of DU 418 (PHY, MAC, RLC), and a portion of CU 419 (PDCP). RUs 411-416 wirelessly exchange network signaling and user data with UE 401. RRC 600 in CU 419 exchanges network signaling with network core 420. The PDCPs in CU 419 exchange user data with UE 401 and with the wireless network slice in network core 420. When UE is attaches to LTE access node 701, RRC 600 selects candidate 5GNR access nodes 412-416 to serve UE 401 based on RSS, co-location, slice, and CA as described herein.

Figure 8:
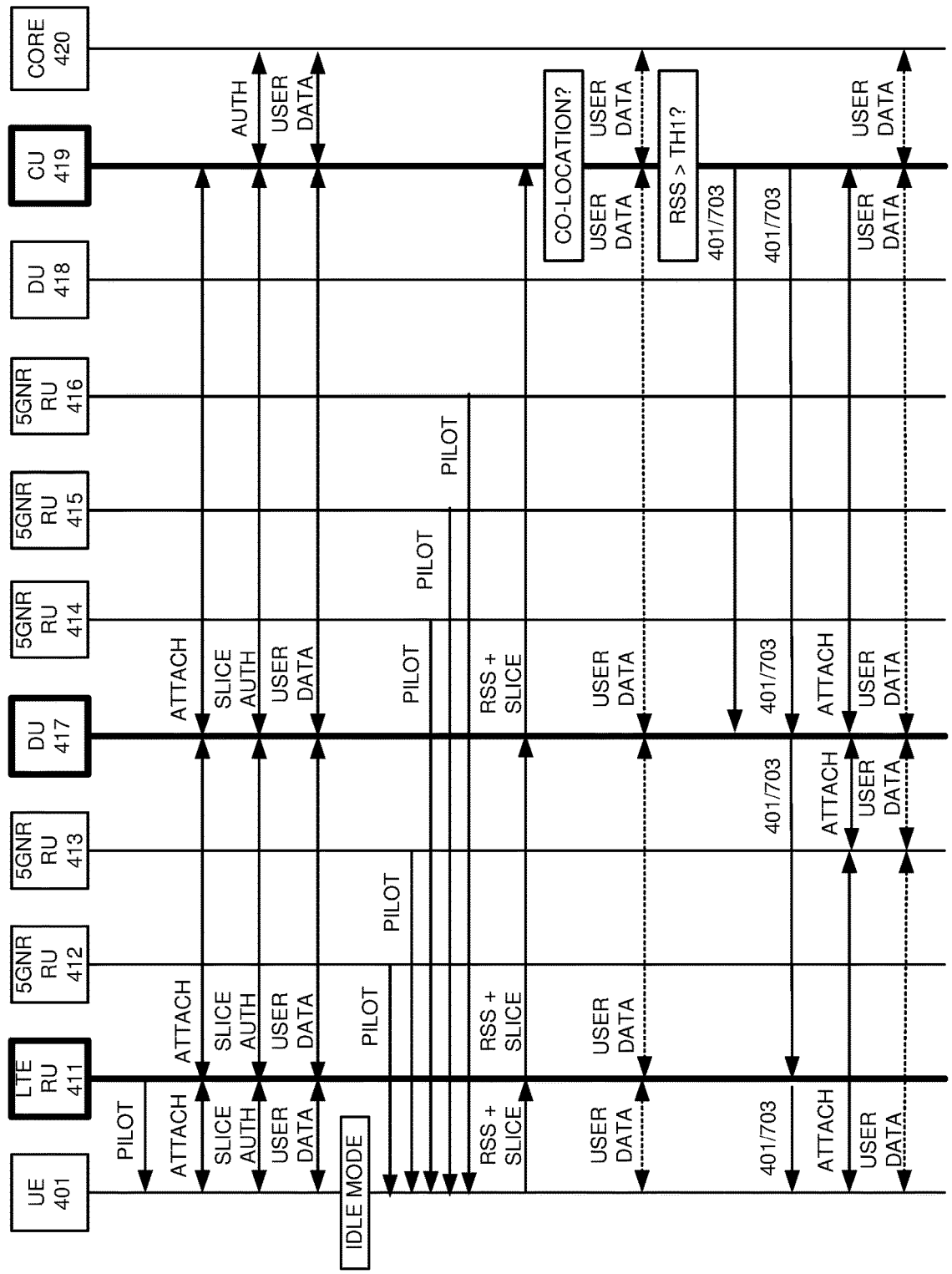
FIG. 8 illustrates an exemplary operation of the 5G wireless communication network to serve the UE based on co-location, RSS, and slice.

FIG. 8 illustrates an exemplary operation of 5G wireless communication network 400 to serve UE 401 based on co-location, RSS, and slice. The operation may differ in other examples. LTE RU 411 transfers a pilot signal for LTE AN 701. UE 401 receives the pilot signal from RU 411. RRC 500 in UE 401 attaches to RRC 600 of LTE AN 701 in CU 419 over RU 411 and DU 417. RRC 500 in UE 401 interacts with RRC 600 in CU 419 over RU 411 and DU 417 to authorize UE 401 for the wireless network slice. UE 401 exchanges user data with the wireless network slice in core 420 over LTE RU 411 and the LTE AN 701 portions of DU 417 and CU 419.

UE 401 goes into idle mode, and in response, RRC 500 in UE 401 determines RSS for 5GNR RUs 412-416 based on their pilot signals. RRC 500 in UE 401 reports the RSS levels to RRC 600 in CU 419 over RU 411 and DU 417. In response to UE 401 entering idle mode, RRC 600 for LTE AN 701 in CU 419 determines if any candidate 5GNR ANs 702-706 are co-located with serving LTE AN 701. When no candidate ANs are co-located with serving LTE AN 701, RRC 600 in CU 419 selects itself (LTE AN 701) for the uplink and the downlink for UE 401 when it leaves idle mode. As shown in dotted lines if LTE AN 701 were selected (it is not in this example), UE 401 would exchange user data with the wireless network slice in core 420 over LTE RU 411 and the LTE AN 701 portions of DU 417 and CU 419.

In this example, RRC 600 for LTE AN 701 in CU 419 determines that candidate ANs 712-713 are co-located with serving AN 701. If one of these candidate ANs 712-713 supports the wireless network slice and has an RSS level that exceeds the first threshold, then RRC 600 for LTE AN 701 in CU 419 selects this candidate AN for the uplink and the downlink for UE 401—otherwise AN 701 is still used. When candidate 5GNR AN 703 is selected for the uplink and the downlink for UE 401, RRC 600 in CU 419 signals the RRC for AN 703 in CU 419 to serve UE 401 over the uplink and downlink to the wireless network slice. The RRC for AN 703 in CU 419 signals the RLC for AN 703 in DU 417 to serve UE 401 over the uplink and downlink to the wireless network slice. RRC 600 for AN 701 in CU 419 signals RRC 500 in UE 401 to use LTE AN 703 for the uplink and downlink to the wireless network slice. UE 401 attaches to the RLC of LTE AN 703 in DU 417 over RU 413. As shown by dotted lines if 5GNR AN 703 were selected for the uplink and downlink (it is not in this example), UE 401 would exchange user data with the wireless network slice in core 420 over the uplink and the downlink that traverse 5GNR RU 413 and the 5GNR AN 703 portions of DU 417 and CU 419. The operation proceeds to FIG. 9.

Figure 9:
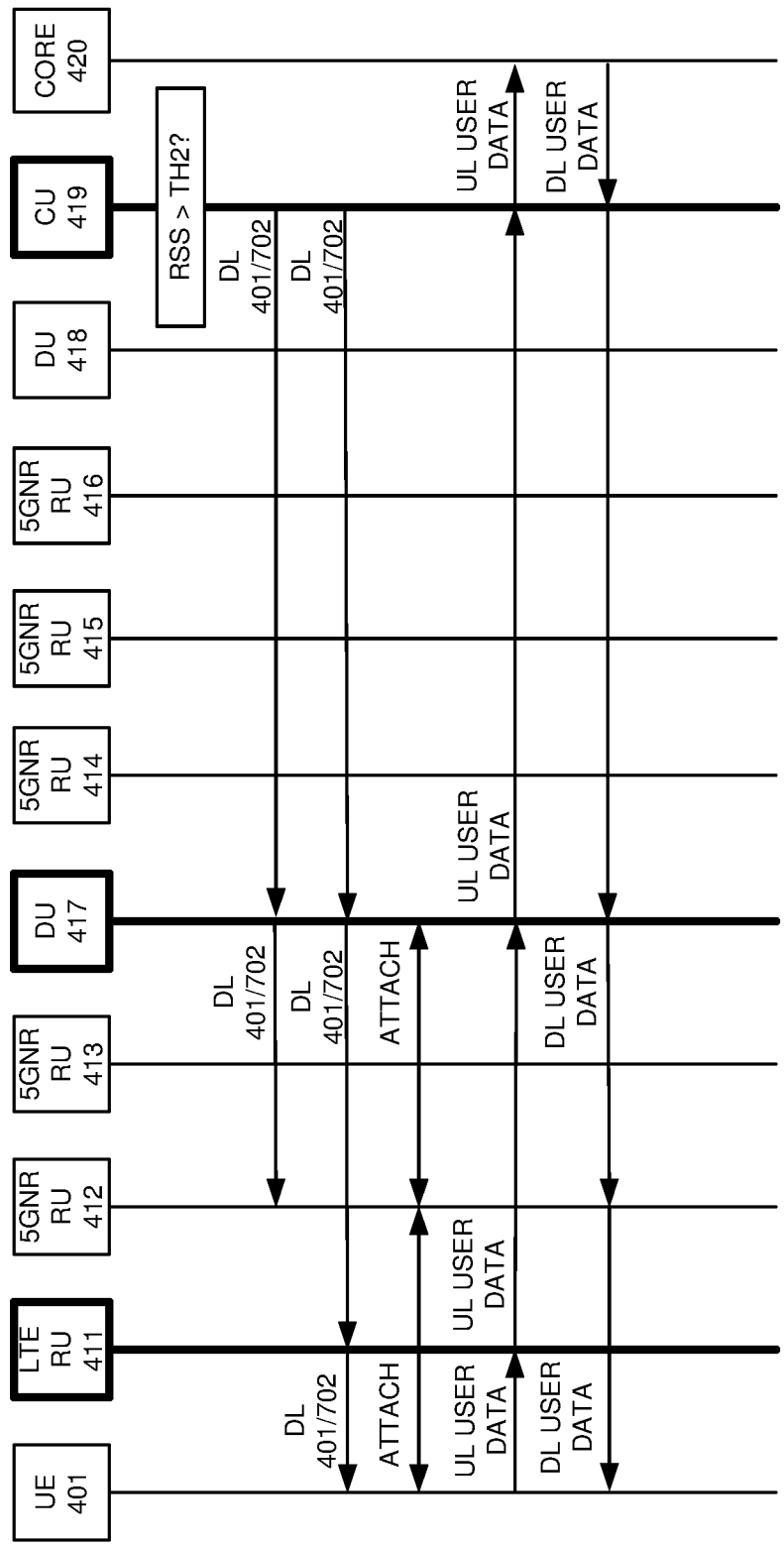
FIG. 9 illustrates an exemplary operation of the 5G wireless communication network to serve the UE based on co-location, RSS, and slice.

FIG. 9 illustrates an exemplary operation of 5G wireless communication network 400 to serve UE 401 based on co-location, RSS, and slice. The operation may differ in other examples. The operation continues from the discussion of FIG. 8 above. If one of co-located and candidate ANs 712-713 supports the wireless network slice and has an RSS level between the first threshold and the second threshold (and no candidate ANs are above the first threshold), then RRC 600 for AN 701 in CU 419 selects this candidate AN for the downlink for UE 401—otherwise AN 701 is still used. When candidate AN 702 is selected for the downlink for UE 401, RRC 600 for AN 701 in CU 419 signals the RRC for AN 702 in CU 419 to serve UE 401 over the downlink for the wireless network slice. The RRC for AN 702 in CU 419 signals the RLC for AN 702 in DU 417 to serve UE 401 over the downlink for the wireless network slice. RRC 600 for AN 701 in CU 419 signals RRC 500 in UE 401 to use 5GNR AN 702 for the downlink from the wireless network slice. RRC 500 in UE 401 attaches to the RLC of LTE AN 702 in DU 417 over RU 412. UE 401 transfers user data to the wireless network slice in core 420 over the uplink that traverses LTE RU 411 and the LTE AN 701 portions of DU 417 and CU 419. UE 401 receives user data from the wireless network slice in core 420 over the downlink that traverses 5GNR RU 412 and the 5GNR AN 702 portions of DU 417 and CU 419.

The wireless data network circuitry described above comprises computer hardware and software that form special-purpose networking circuitry to serve UEs based on co-location, RSS, and slice. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose networking circuitry to serve UEs based on co-location, RSS, and slice.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to serve a User Equipment (UE) based on co-location and Received Signal Strength (RSS) levels, the method comprising:
    a serving wireless access node selecting the serving wireless access node for an uplink and a downlink for the UE when candidate wireless access nodes are not co-located with the serving wireless access node, and in response, wirelessly exchanging user data with the UE over the uplink and the downlink;
    the serving wireless access node selecting one of the candidate wireless access nodes for the uplink and the downlink for the UE when the one of the candidate wireless access nodes is co-located with the serving wireless access node and has a highest one of the RSS levels that exceeds a first threshold;
    the one of the candidate wireless access nodes wirelessly exchanging the user data with the UE over the uplink and the downlink when the one of the candidate wireless access nodes is co-located with the serving wireless access node and has the highest one of the RSS levels that exceeds the first threshold;
    the serving wireless access node selecting the serving wireless access node for the uplink for the UE and selecting another one of the candidate wireless access nodes for the downlink for the UE when the other one of the candidate wireless access nodes has the highest one of the RSS levels that falls below the first threshold and that exceeds a second threshold, and wirelessly receiving an uplink portion of the user data from the UE over the uplink; and
    the other one of the candidate wireless access nodes wirelessly transferring a downlink portion of the user data to the UE over the downlink when the other one of the candidate wireless access nodes is co-located with the serving wireless access node and has the highest one of the RSS levels that falls below the first threshold and exceeds the second threshold.

2. The method of claim 1 wherein:
    the UE enters idle mode;
    the serving wireless access node selecting the one of the candidate wireless access nodes comprises selecting the one of the candidate wireless access nodes in response to the UE entering the idle mode; and
    the serving wireless access node selecting the other one of the candidate wireless access nodes comprises selecting the other one of the candidate wireless access nodes in response to the UE entering the idle mode.

3. The method of claim 1 wherein:
    the UE uses a wireless network slice and enters idle mode; and
    the serving wireless access node selecting the one of the candidate wireless access nodes comprises selecting the one of the candidate wireless access nodes in response to the UE entering the idle mode and based on the one of the candidate wireless access nodes supporting the wireless network slice; and
    the serving wireless access node selecting the other one of the candidate wireless access nodes comprises selecting the other one of the candidate wireless access nodes in response to the UE entering the idle mode and based on the other one of the candidate wireless access nodes supporting the wireless network slice.

4. The method of claim 1 wherein:
    the UE uses an Ultra Reliable Low Latency Communications (URLLC) network slice and enters idle mode;
    the serving wireless access node selecting the one of the candidate wireless access nodes comprises selecting the one of the candidate wireless access nodes in response to the UE entering the idle mode and based on the one of the candidate wireless access nodes supporting the URLLC network slice; and
    the serving wireless access node selecting the other one of the candidate wireless access nodes comprises selecting the other one of the candidate wireless access nodes in response to the UE entering the idle mode and based on the other one of the candidate wireless access nodes supporting the URLLC network slice.

5. The method of claim 1 wherein:
    the UE uses an enhanced Mobile Broadband (eMBB) network slice and enters idle mode;
    the serving wireless access node selecting the one of the candidate wireless access nodes comprises selecting the one of the candidate wireless access nodes in response to the UE entering the idle mode and based on the one of the candidate wireless access nodes supporting the eMBB network slice; and
    the serving wireless access node selecting the other one of the candidate wireless access nodes comprises selecting the other one of the candidate wireless access nodes in response to the UE entering the idle mode and based on the other one of the candidate wireless access nodes supporting the eMBB network slice.

6. The method of claim 1 wherein:
    the UE uses a massive Machine Type Communication (mMTC) network slice and enters idle mode;
    the serving wireless access node selecting the one of the candidate wireless access nodes comprises selecting the one of the candidate wireless access nodes in response to the UE entering the idle mode and based on the one of the candidate wireless access nodes supporting the mMTC network slice; and
    the serving wireless access node selecting the other one of the candidate wireless access nodes comprises selecting the other one of the candidate wireless access nodes in response to the UE entering the idle mode and based on the other one of the candidate wireless access nodes supporting the mMTC network slice.

7. The method of claim 1 wherein:
the UE uses Carrier Aggregation (CA) and enters idle mode; and
the serving wireless access node selecting the one of the candidate wireless access nodes comprises selecting the one of the candidate wireless access nodes in response to the UE entering the idle mode and based on the one of the candidate wireless access nodes supporting the CA; and
the serving wireless access node selecting the other one of the candidate wireless access nodes comprises selecting the other one of the candidate wireless access nodes in response to the UE entering the idle mode and based on the other one of the candidate wireless access nodes supporting the CA.

8. The method of claim 1 wherein:
the serving wireless access node comprises a Long Term Evolution (LTE) access node; and
at least some of the candidate wireless access nodes comprise Fifth Generation New Radio (5GNR) access nodes.

9. The method of claim 1 wherein:
the serving wireless access node comprises a Fifth Generation New Radio (5GNR) access node; and
at least some of the candidate wireless access nodes comprise Long Term Evolution (LTE) access nodes.

10. The method of claim 1 wherein:
the serving wireless access node comprises a Fifth Generation New Radio (5GNR) access node; and
at least some of the candidate wireless access nodes comprise Millimeter Wave (mmW) access nodes.

11. A wireless communication network to serve a User Equipment (UE) based on co-location and Received Signal Strength (RSS) levels, the wireless communication network comprising:
a serving wireless access node configured to select the serving wireless access node for an uplink and a downlink for the UE when candidate wireless access nodes are not co-located with the serving wireless access node, and in response, wirelessly exchange user data with the UE over the uplink and the downlink;
the serving wireless access node configured to select one of the candidate wireless access nodes for the uplink and the downlink for the UE when the one of the candidate wireless access nodes is co-located with the serving wireless access node and has a highest one of the RSS levels that exceeds a first threshold;
the one of the candidate wireless access nodes configured to wirelessly exchange the user data with the UE over the uplink and the downlink when the one of the candidate wireless access nodes is co-located with the serving wireless access node and has the highest one of the RSS levels that exceeds the first threshold;
the serving wireless access node configured to select the serving wireless access node for the uplink for the UE and select another one of the candidate wireless access nodes for the downlink for the UE when the other one of the candidate wireless access nodes has the highest one of the RSS levels that falls below the first threshold and that exceeds a second threshold, and wirelessly receive an uplink portion of the user data from the UE over the uplink; and
the other one of the candidate wireless access nodes configured to wirelessly transfer a downlink portion of the user data to the UE over the downlink when the other one of the candidate wireless access nodes is co-located with the serving wireless access node and has the highest one of the RSS levels that falls below the first threshold and exceeds the second threshold.

12. The wireless communication network of claim 11 wherein:
the UE enters idle mode;
the serving wireless access node is configured to select the one of the candidate wireless access nodes in response to the UE entering the idle mode to select the one of the candidate wireless access nodes; and
the serving wireless access node is configured to select the other one of the candidate wireless access nodes in response to the UE entering the idle mode to select the other one of the candidate wireless access nodes.

13. The wireless communication network of claim 11 wherein:
the UE uses a wireless network slice and enters idle mode; and
the serving wireless access node is configured to select the one of the candidate wireless access nodes in response to the UE entering the idle mode and based on the one of the candidate wireless access nodes supporting the wireless network slice to select the one of the candidate wireless access nodes; and
the serving wireless access node is configured to select the other one of the candidate wireless access nodes in response to the UE entering the idle mode and based on the other one of the candidate wireless access nodes supporting the wireless network slice to select the other one of the candidate wireless access nodes.

14. The wireless communication network of claim 11 wherein:
the UE uses an Ultra Reliable Low Latency Communications (URLLC) network slice and enters idle mode;
the serving wireless access node is configured to select the one of the candidate wireless access nodes in response to the UE entering the idle mode and based on the one of the candidate wireless access nodes supporting the URLLC network slice to select the one of the candidate wireless access nodes; and
the serving wireless access node is configured to select the other one of the candidate wireless access nodes in response to the UE entering the idle mode and based on the other one of the candidate wireless access nodes supporting the URLLC network slice to select the other one of the candidate wireless access nodes.

15. The wireless communication network of claim 11 wherein:
the UE uses an enhanced Mobile Broadband (eMBB) network slice and enters idle mode;
the serving wireless access node is configured to select the one of the candidate wireless access nodes in response to the UE entering the idle mode and based on the one of the candidate wireless access nodes supporting the eMBB network slice to select the one of the candidate wireless access nodes; and
the serving wireless access node is configured to select the other one of the candidate wireless access nodes in response to the UE entering the idle mode and based on the other one of the candidate wireless access nodes supporting the eMBB network slice to select the other one of the candidate wireless access nodes.

16. The wireless communication network of claim 11 wherein:
the UE uses a massive Machine Type Communication (mMTC) network slice and enters idle mode;

the serving wireless access node is configured to select the one of the candidate wireless access nodes in response to the UE entering the idle mode and based on the one of the candidate wireless access nodes supporting the mMTC network slice to select the one of the candidate wireless access nodes; and the serving wireless access node is configured to select the other one of the candidate wireless access nodes in response to the UE entering the idle mode and based on the other one of the candidate wireless access nodes supporting the mMTC network slice to select the other one of the candidate wireless access nodes.

17. The wireless communication network of claim 11 wherein:

the UE uses Carrier Aggregation (CA) and enters idle mode; and the serving wireless access node is configured to select the one of the candidate wireless access nodes in response to the UE entering the idle mode and based on the one of the candidate wireless access nodes supporting the CA to select the one of the candidate wireless access nodes; and the serving wireless access node is configured to select the other one of the candidate wireless access nodes in response to the UE entering the idle mode and based on the other one of the candidate wireless access nodes supporting the CA to select the other one of the candidate wireless access nodes.

18. The wireless communication network of claim 11 wherein:

the serving wireless access node comprises a Long Term Evolution (LTE) access node; and at least some of the candidate wireless access nodes comprise Fifth Generation New Radio (5GNR) access nodes.

19. The wireless communication network of claim 11 wherein:

the serving wireless access node comprises a Fifth Generation New Radio (5GNR) access node; and at least some of the candidate wireless access nodes comprise Long Term Evolution (LTE) access nodes.

20. The wireless communication network of claim 11 wherein:

the serving wireless access node comprises a Fifth Generation New Radio (5GNR) access node; and at least some of the candidate wireless access nodes comprise Millimeter Wave (mmW) access nodes.

* * * * *